United States Patent [19]
Lee

[11] Patent Number: 5,936,446
[45] Date of Patent: Aug. 10, 1999

[54] PWM VARIABLE VOLTAGE LOAD DRIVER WITH PEAK VOLTAGE LIMITATION

[75] Inventor: Nai-Chi Lee, Peekskill, N.Y.

[73] Assignee: Philips Electronics North America Corporation, New York, N.Y.

[21] Appl. No.: 08/739,771

[22] Filed: Oct. 30, 1996

[51] Int. Cl.[6] ............................. H03K 3/017; G05F 1/10
[52] U.S. Cl. ..................... 327/172; 327/177; 327/108; 327/538
[58] Field of Search ......................... 327/108–112, 538, 327/427, 434–437, 172, 175, 177

[56] References Cited

U.S. PATENT DOCUMENTS

| | | | |
|---|---|---|---|
| 3,446,992 | 5/1969 | Barniskis et al. | 307/265 |
| 4,593,347 | 6/1986 | Peruth et al. | 331/112 |
| 5,422,562 | 6/1995 | Mammano et al. | 327/538 |
| 5,457,435 | 10/1995 | Hoffman | 332/110 |
| 5,663,667 | 9/1997 | Blum et al. | 327/134 |

OTHER PUBLICATIONS

U.S. application No. 08/674,073, filed on Jul. 1, 1996.
SwitcherCAD User's Manual, 1992, pp. 5–9 to 5–11.
L.H. Dixon, Jr., "Switching Power Supply Topology Review", Unitrode Switching Regulated Power Supply Design Seminar Manual, 1994, pp. P1–1 to P1–3.

*Primary Examiner*—Toan Tran
*Attorney, Agent, or Firm*—Robert J. Kraus

[57] ABSTRACT

Pulse width modulation driver circuitry both limits and regulates the voltage that is applied to a load from a power source which provides a voltage that may far exceed the maximum safe load voltage. The driver circuitry includes a reactive filter coupled to the load, a voltage sensor for sensing the instantaneous voltage across the load, a timer, and a comparator. The reactive filter alternately takes in energy from the power source and discharges it into the load. The voltage sensor, timer, and comparator cooperate with a switch to modulate the application of power to the load and to the reactive filter in response to the instantaneous magnitudes of the load voltage and the power source voltage.

4 Claims, 3 Drawing Sheets

PWM VARIABLE VOLTAGE LOAD DRIVER WITH PEAK VOLTAGE LIMITATION

BACKGROUND OF THE INVENTION

1. Field of the Invention

This invention relates to pulse width modulation (PWM) driving of a load that is powered by a variable voltage DC power source.

2. Description of Related Art

U.S. Pat. No. 3,446,992 describes a PWM circuit for driving a load from a DC voltage power source, while automatically compensating for fluctuations in the supplied voltage. This circuit includes a relaxation oscillator that applies output pulses to a monostable multivibrator which, in turn, applies pulses to a switching transistor connected in series with a motor winding and a DC power source. The oscillator output pulses control the frequency at which the multivibrator produces output pulses. This frequency varies inversely with variations of the power source voltage, which voltage is applied to the oscillator as a feedback signal. The widths of the pulses produced by the multivibrator are controlled in response to an input signal and variations of the power source voltage, which voltage is also applied to the multivibrator as a feedback signal.

While PWM circuits such as that described in U.S. Pat. No. 3,446,992 might well compensate for variations in a known, substantially constant power source voltage, in some applications compensation must be provided over a wide range of power source voltages. An example is the driving of a motor for operating a remotely located circuit breaker. Such circuit breakers are used, for example, at remote cites in geographically large telecommunications systems, where different power source voltages are provided or where the power source voltages are subject to severe changes, e.g. greater than 2:1.

A PWM circuit which does compensate for variations over a wide range of power source voltages is disclosed in U.S. patent application Ser. No. 08/674,073 filed on Jul. 1, 1996. This circuit is useful in driving a variety of loads, but does not limit the instantaneous voltage across the load. With some loads, such as motors with internal circuit elements having maximum peak operating voltages, it is desirable that the PWM driver circuitry limit the voltage permitted across the load.

SUMMARY OF THE INVENTION

It is an object of the invention to provide a pulse width modulation apparatus for driving a load at a limited voltage, even with large fluctuations in a known voltage for powering the load.

It is another object of the invention to provide a pulse width modulation apparatus for driving a load at a limited voltage over a wide range of different voltages for powering the load.

It is yet another object of the invention to provide a pulse width modulation apparatus which is capable of driving a load at a substantially constant load voltage, despite substantial fluctuations in a voltage for powering the load.

As used in this application, the term variable voltage power source is defined as a power source which provides a fluctuating voltage and/or provides one of a range of different voltages.

In accordance with the invention, a pulse width modulation driver comprises reactive filter means electrically connected to the load, power switching means electrically connected to the load through the reactive filter means for controllable interrupting current supplied to the load by the power source, comparator means for producing output signals for controlling the power switching means, voltage sensing means for sensing the voltage applied to the load, and timing means for applying voltages to inputs of the comparator in response to variations of the sensed voltage. The comparator means includes an output electrically connected to a control input of the power switching means, and first and second inputs. The comparator means alternately produces at the output:

an ON signal, for placing the power switching means in a closed state, in response to application to the first input of a signal having a first predetermined voltage; and an OFF signal, for placing the power switching means in an open state, in response to application to the second input of a signal having a second predetermined voltage.

The timing means includes a variable voltage source for:

after a first delay, in response to a decrease of the sensed load voltage to a lower magnitude, applying the first predetermined voltage to the first input of the comparator; and after a second delay, in response to an increase of the sensed load voltage to an upper magnitude, applying the second predetermined voltage to the second input of the comparator.

DESCRIPTION OF THE PREFERRED EMBODIMENT

Figure 1:
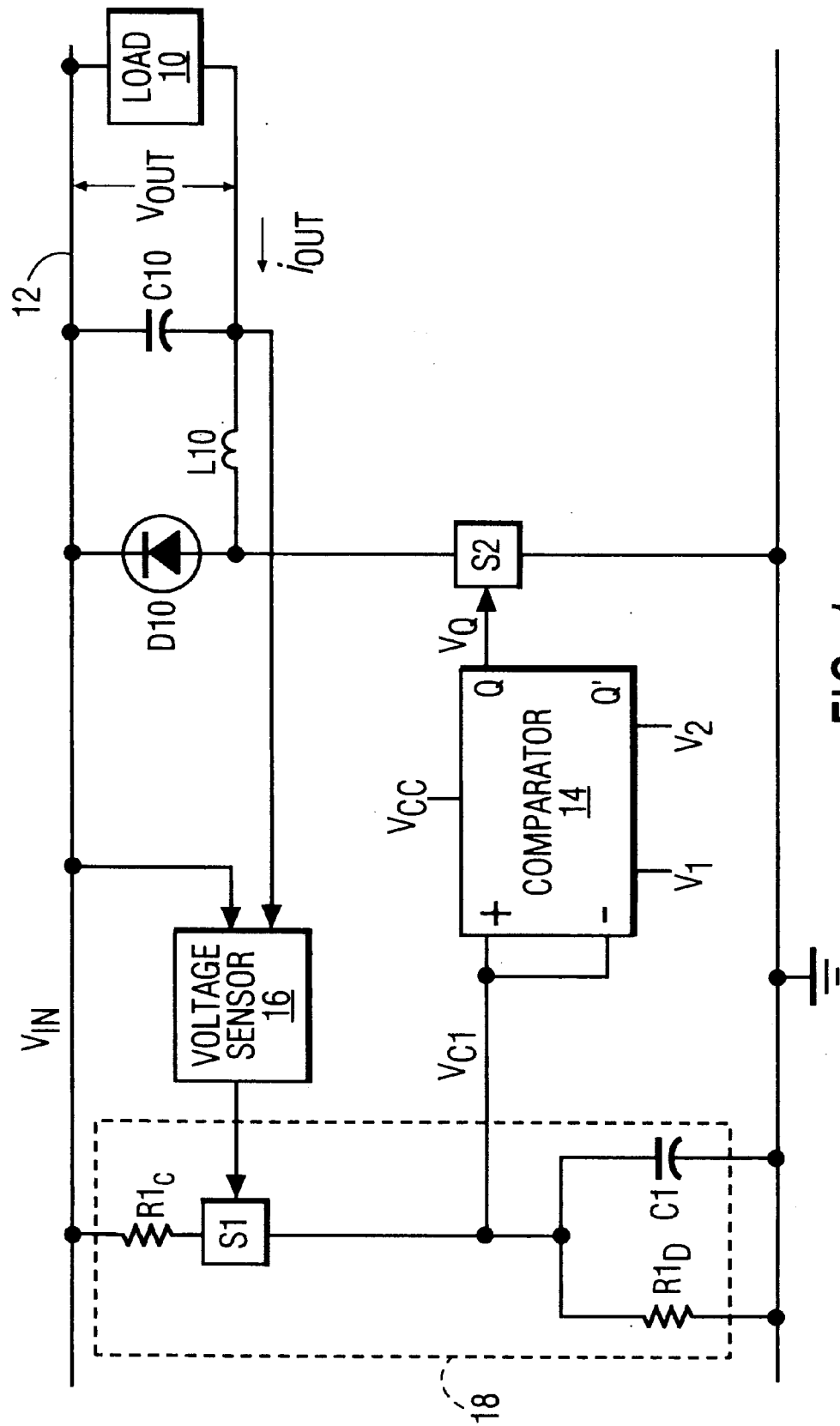
FIG. 1 is a block diagram illustrating an embodiment of a power system including a pulse width modulation driver in accordance with the invention.

FIG. 1 illustrates a power system including a load 10, a power bus 12 for providing power from a variable voltage source (not shown), and a pulse width modulation driver in accordance with a preferred embodiment of the invention. The pulse width modulation driver includes a reactive filter comprising capacitor C10, inductor L10 and diode D10, a controllable power switch S2 that is electrically connected to the load 10 through the reactive filter, a comparator 14 having a memory capability, a voltage sensor 16, and a timing circuit 18.

The reactive filter cooperates with the power switch to regulate a voltage $V_{OUT}$ applied across the load 10. When the switch S2 is in a closed state, it provides a path to ground for current flowing through the inductor L10, which is a sum of the current through the load 10 and the charging current for capacitor C10. When this switch is in an open state, energy stored in the inductor discharges through the diode and into the load and the capacitor. A more thorough description of the operation of this type of reactive filter is provided in an article titled "Switching Power Supply Topology Review" by Lloyd H. Dixon, Jr., Unitrode Switching Regulated Power Supply Design Seminar Manual (1994), which article is hereby incorporated by reference.

The comparator 14 has an inverting input (−), a non-inverting input (+), a Q output, and inputs for three regulated DC voltages that are provided by conventional voltage regulator circuitry (not shown) that is powered by the bus 12. These voltages are a voltage $V_{CC}$ for powering the comparator, a first reference voltage $V_1$ and a second reference voltage $V_2$. Functionally, the comparator produces at the Q output:

a first DC voltage, designated as the ON signal, whenever a voltage lower than $V_1$ is applied to the inverting input (−); or a second DC voltage, designated as an OFF signal, whenever voltages greater than $V_1$ and $V_2$ are applied simultaneously to the inverting and non-inverting inputs.

The Q output of the comparator is electrically connected to a control input of the switch S2, which assumes the closed state when the comparator produces the ON signal and assumes the open state when the comparator produces the OFF signal.

The voltage sensor 16 has first and second inputs, electrically connected across the load 10, and a single output. This sensor senses a voltage $V_{OUT}$ across the load and produces at its output:

an ON signal when the load voltage $V_{OUT}$ increases to an upper magnitude; or an OFF signal when the load voltage $V_{OUT}$ decreases to a lower magnitude.

The timing circuit 18 includes a controllable timer switch S1, that is electrically connected in series with a resistor $R1_C$, and the parallel combination of a capacitor C1 and a resistor $R1_D$. This entire circuit is electrically connected between the power bus 12 and ground. A control input of the switch is electrically connected to the output of the voltage sensor 16. One plate of the capacitor is electrically connected to the inverting input (−) and to the non-inverting input (+) of the comparator 14. Functionally, the switch S1 controls charging and discharging of the capacitor C1 in accordance with the existing signal being produced at the output of the voltage sensor 16. Whenever this sensor produces the ON signal, indicating that the load voltage $V_{OUT}$ has increased to an upper magnitude, switch S1 closes and capacitor C1 charges, via switch S1 and resistor $R1_C$, toward whatever power source voltage $V_{IN}$ is currently being supplied to the bus 12. Whenever the voltage sensor produces the OFF signal, indicating that the load voltage $V_{OUT}$ has decreased to a lower magnitude, switch S1 opens and allows capacitor C1 to discharge through resistor $R1_D$.

Figure 2A:
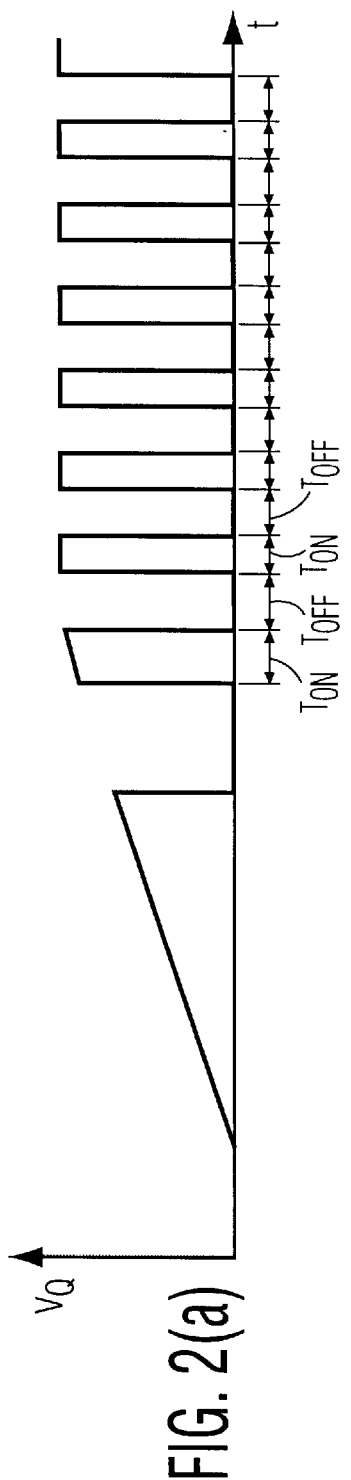
FIGS. 2(a)–2(c) are timing diagram illustrating operation of the pulse width modulation driver of FIG. 1.
Figure 2B:
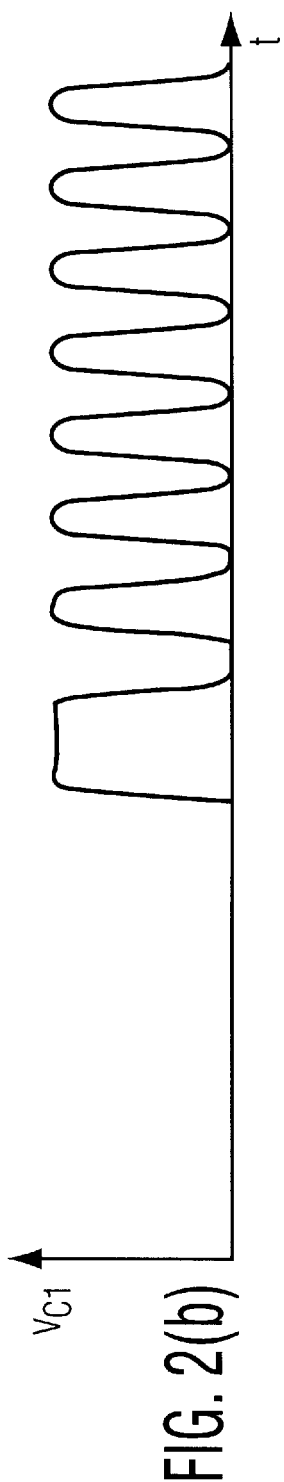
Figure 2C:
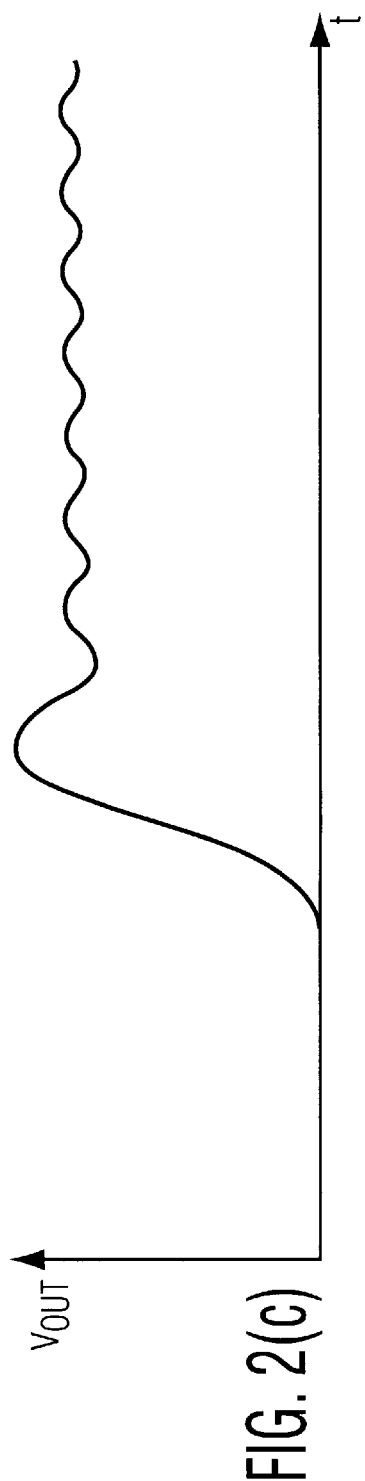

Operation of the exemplary pulse width modulation driver illustrated in FIG. 1 can be better understood with the aid of the timing diagram of FIG. 2. This diagram includes plots of voltage versus time for significant signals, identified in FIG. 1, that are occurring simultaneously in the driver circuitry. These plots are idealized and are not drawn to scale, but generally illustrate the shapes and timing relationships of the different signals. Specifically, in the timing diagram:

FIG. 2a illustrates the voltage $v_Q$ at the Q output of the comparator 14;

FIG. 2b illustrates the voltage $v_{C1}$ on the plate of capacitor C1 that is electrically connected to the inputs of the comparator 14; and FIG. 2c illustrates the voltage $V_{OUT}$ across the load 10. The relatively few cycles of operation of the pulse width modulation driver circuitry of FIG. 1, that are illustrated in FIG. 2, show both initial and steady state operation of the circuitry.

When the variable voltage $V_{IN}$ is initially applied to the power bus 12, both of the switches S1 and S2 are in their nonconducting states, capacitor C1 is uncharged, and no current is flowing through the load. The voltages $V_{CC}$, $V_1$ and $V_2$ are derived from the variable power source voltage $V_{IN}$ and rise from ground potential. However, capacitor C1 remains uncharged because switch S1 remains open. Thus, the voltage $v_{C1}$ is at ground potential, which is lower than $V_1$, and comparator 14 produces at the Q output the ON signal, which has the magnitude $v_Q$ and is substantially equal to the instantaneous value of $V_{CC}$. As soon as the ON signal voltage $v_Q$ is sufficiently large to cause the power switch S3 (typically a transistor device) to conduct, current begins to flow through the load 10, the capacitor C10, and the inductor L10 to ground. This is indicated in FIG. 2C by the rising voltage $V_{OUT}$ across the load and capacitor C10.

When the voltage sensor 16 detects that the voltage $V_{OUT}$ has increased to the upper magnitude, it produces the ON signal causing timer switch S1 to conduct and capacitor C1 to begin charging through resistor $R1_C$. The values of $R1_C$ and C1 are chosen to delay the charging of capacitor C1 to the voltage $V_2$ for a period which is:

long enough to ensure that the inductor L10 has stored sufficient energy to drive the load during the next period when switch S2 is not conducting;

but not so long as to allow the load voltage $V_{OUT}$ to reach the maximum operating voltage of the load.

When capacitor C1 charges to the voltage $V_2$, comparator 14 produces the OFF signal at the Q output, with the voltage $v_Q$ dropping to approximately ground potential, causing power switch S2 to go into the non-conducting state. During the existence of this state, inductor L10 discharges its stored energy through diode D10 and into capacitor C10 and the load. Then capacitor C10 also begins to discharge causing the voltage $V_{OUT}$ across the load to decrease.

When the voltage sensor 16 detects that the voltage $V_{OUT}$ has decreased to the lower magnitude, it produces the OFF signal causing timer switch S1 to stop conducting. This enables capacitor C1 to begin to discharge through resistor $R1_D$. The time constant of resistor $R1_D$ combined with capacitor C1 is not critical, but is chosen to delay the discharging of capacitor C1 to the voltage $V_1$ for a period which is:

long enough to ensure that the switch S2 is not turned on immediately, especially when the variable voltage $V_{IN}$ of the power source is much higher than the maximum allowable operating voltage of the load;

but not so long as to allow the load voltage $V_{OUT}$ to decrease below a minimum desired operating voltage.

When the voltage on capacitor C1 discharges below $V_1$, the comparator 14 again produces the ON signal causing switch S2 to conduct current from the load, thus beginning the next cycle of operation. It is at this time that repetitive cycles of steady state operation begin.

Each cycle of steady state operation of the pulse width modulation driver includes an ON period of duration $T_{ON}$ and on OFF period of duration $T_{OFF}$. The duration of each ON period, which is determined in part by the time it takes for capacitor C1 to charge to the voltage $V_2$, is inversely related to the magnitude of the power source voltage $V_{IN}$. This results from the fact that C1 charges more quickly toward the fixed reference voltage $V_2$ if the source voltage is increased. The duration of each OFF period, however, is determined primarily by the magnitude of the load current $I_{OUT}$. The higher the load current, the more quickly the voltage $V_{OUT}$ across capacitor C10 will discharge to the lower magnitude and cause switch S1 to stop conducting, thereby enabling capacitor C1 to begin discharging toward the voltage $V_1$. Thus the pulse width modulation driver automatically adjusts both the ON and the OFF periods to compensate for changes in the power source voltage and the load current.

Figure 3:
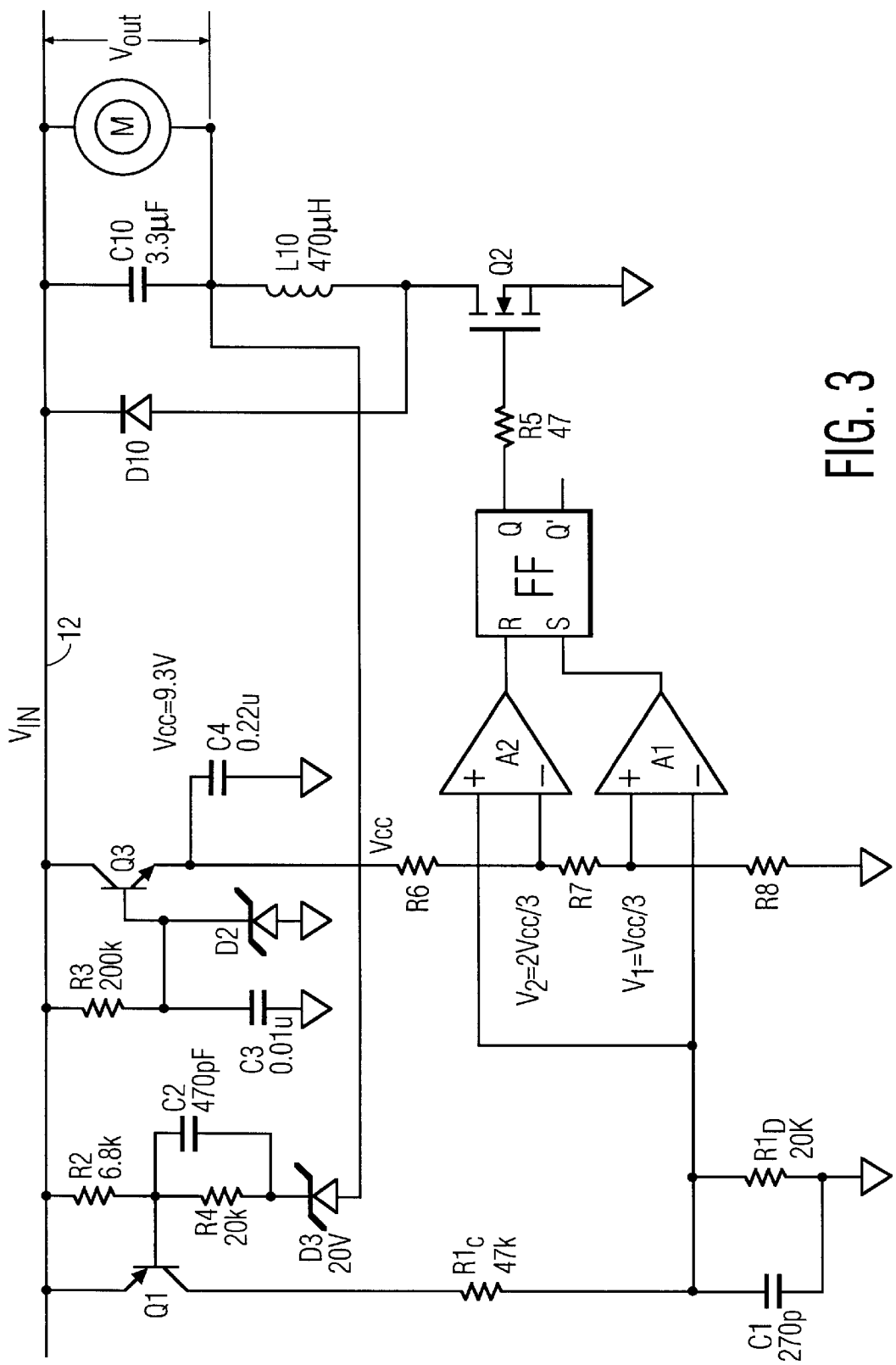
FIG. 3 is a schematic diagram of an embodiment of a circuit which may be used to implement the pulse width modulation driver of FIG. 1.

FIG. 3 illustrates a power system for load comprising a DC motor and includes a specific PWM driver circuit of the type depicted in FIG. 1. In this particular example, the motor M is rated to operate at a nominal voltage of 22 volts DC, but must be capable of operating over a range of power source voltages $V_{IN}$ that can vary from 22 to 80 volts DC. Further, the motor includes internal circuitry which may be damaged by peak voltages in excess of 27 volts. This driver circuit will regulate the motor voltage at 22±2 volts over the entire range of power source voltages. Parts that are similar to those in FIG. 1 are identically numbered.

The controllable power switch is in the form of a field effect transistor Q2 having a gate terminal connected to the Q output of the comparator for providing the ON and OFF signals.

The comparator includes first and second differential amplifiers A1 and A2, respectively, and an RS flip flop FF. The Q output of the flip flop serves as the output of the comparator. An inverting input (−) of amplifier A1 serves as the inverting input of the comparator, while a non-inverting input of amplifier A2 serves as the non-inverting input of the comparator.

A conventional voltage regulator circuit is provided for producing the voltage $V_{CC}$ for powering the amplifiers A1, A2 and the flip flop FF. This voltage regulator circuit includes an NPN transistor Q3, and a series combination of a resistor R3 and a 10 volt zener diode D2. The base terminal of the transistor, the cathode terminal of the zener diode, and one terminal of the resistor are connected at a common junction. The other terminal of the resistor and the collector terminal of the transistor are connected to the power bus 12, while the anode terminal of the zener diode is connected to ground. A filtering capacitor C3 is connected between the base terminal of the transistor and ground. The emitter terminal of the transistor Q3, which provides the voltage $V_{CC}$, is connected to ground via a filtering capacitor C4. Although not shown in FIG. 3, this emitter terminal is also connected to power terminals of the differential amplifiers A1, A2 and of the RS flip flop FF.

The emitter terminal of the transistor Q3 is further connected to ground through a conventional resistive voltage divider including three serially connected resistors R6, R7 and R8. In this embodiment, the resistors have equal resistances and produce, at respective connecting junctions, the reference voltages $V_1 = \frac{1}{3} V_{CC}$ and $V_2 = \frac{2}{3} V_{CC}$. The junction at which reference voltage $V_1$ is produced is connected to a non-inverting input of amplifier A1, while the junction at which reference voltage $V_2$ is produced is connected to an inverting input of amplifier A2.

The timing circuit includes a PNP switching transistor Q1, the resistor $R1_C$, the capacitor C1 and the resistor $R1_D$. The emitter of the transistor is connected to the power bus 12. The collector of the transistor is connected to ground through the resistor $R1_C$ in series with the parallel combination of the capacitor C1 and the resistor $R1_D$. The base of switching transistor Q1, which serves as the control input, is connected to the output of the voltage sensor.

The voltage sensor includes a zener diode D3 with a breakdown voltage of 20 volts, bias resistors R2 and R4, and a bypass capacitor C2 for increasing the turn-on speed of transistor Q1. The anode terminal of the zener diode is connected to the junction at which capacitor C10 and inductor L10 are connected to each other. This terminal serves as the input of the voltage sensor. The cathode of the zener diode is connected through the parallel combination of resistor R4 and capacitor C2, and then through series resistor R2, to the power bus 12. A junction at which resistors R2 and R4 and capacitor C2 are connected serves as the output of the voltage sensor.

Operation of the circuit of FIG. 3 has already been explained in connection with FIGS. 1 and 2, except for the details of operation of the specific type of voltage sensor and timer switch S1 included in the circuit. Zener diode D3 breaks down and conducts (turns ON) when the output voltage $V_{OUT}$ across the motor M increases to an upper magnitude that is slightly greater than 20 volts. However, transistor Q1 will not begin to conduct until the output voltage $V_{OUT}$ reaches approximately 22 volts because of the voltage divider formed by resistors R2 and R4. At this upper magnitude of the output voltage, the zener diode draws current through the base-emitter junction of transistor Q1 (serving as timer switch S1), thereby placing the transistor in a conducting state, ultimately resulting in the turnoff of transistor Q2. Transistor Q1 remains in the conducting state until the output voltage $V_{OUT}$ across the motor M decreases to a lower magnitude that is slightly smaller than 22 volts. At this lower magnitude, the voltage at the base junction of transistor Q1 (the output voltage of the voltage sensor) decreases to a magnitude at which the transistor Q1 ceases to conduct (turns OFF), thereby placing this transistor in its non-conducting state. This ultimately results in the turn on of transistor Q2 and the increase of the output voltage to the upper magnitude, thus beginning a repetition of the cycle.

I claim:

1. A pulse width modulation driver for controlling a voltage applied to a load powered by a power source which produces a variable voltage, said driver comprising:
   a. reactive filter means electrically connected to the load;
   b. power switching means electrically connected to the load through the reactive filter means for controllably interrupting current supplied to said load by the power source, said power switching means including a control input;
   c. comparator means including an output electrically connected to the control input of the power switching means and first and second inputs, said comparator means alternately producing at said output:
      i. an ON signal, for placing said power switching means in a closed state, in response to application to the first input of a first predetermined voltage;
      ii. an OFF signal, for placing said power switching means in an open state, in response to application to the second input of a second predetermined voltage;
   d. voltage sensing means electrically connected to the load for sensing the voltage applied to the load;
   e. timing means electrically connected to the comparator and to the voltage sensing means for producing a variable voltage for:
      i. after a first delay, in response to a decrease of the sensed load voltage to a lower load voltage magnitude, applying the first predetermined voltage to the first input of the comparator;
      ii. after a second delay, in response to an increase of the sensed load voltage to an upper load voltage magnitude, applying the second predetermined voltage to the second input of the comparator.

2. A pulse width modulation driver for controlling a voltage applied to a load powered by a power source which produces a variable voltage, said driver comprising:
   a. reactive filter means electrically connected to the load;

b. power switching means electrically connected to the load through the reactive filter means for controllably interrupting current supplied to said load by the power source, said power switching means including a control input;

c. comparator means including an output electrically connected to the control input of the power switching means and first and second inputs, said comparator means alternately producing at said output:
  i. an ON signal, for placing said power switching means in a closed state, in response to application to the first input of a first predetermined voltage;
  ii. an OFF signal, for placing said power switching means in an open state, in response to application to the second input of a second predetermined voltage;

d. voltage sensing means electrically connected to the load for sensing the load voltage and having an output for producing:
  i. an ON signal when the load voltage increases to an upper load voltage magnitude; or
  ii. an OFF signal when the load voltage decreases to a lower load voltage magnitude e. timing means electrically connected to the first and second inputs of the comparator and to the output of the voltage sensing means for producing a variable voltage for:
  i. after a first delay, in response to the production of the OFF signal by the voltage sensing means, applying the first predetermined voltage to the first input of the comparator;
  ii. after a second delay, in response to the production of the ON signal by the voltage sensing means, applying the second predetermined voltage to the second input of the comparator.

3. A pulse width modulation driver as in claim 1 or 2 where the reactive filter means includes an inductor and where the second delay is sufficiently long to ensure that the inductor has stored sufficient energy to drive the load during a following period when the power switching means is in the open state.

4. A pulse width modulation driver as in claim 1 or 2 where the power switching means is alternately in the ON and OFF states for respective ON and OFF periods, each ON period being inversely related to the magnitude of the power source voltage and each OFF period being inversely related to the magnitude of current through the load.

* * * * *